United States Patent
Fangmeier et al.

(10) Patent No.: US 11,987,364 B2
(45) Date of Patent: May 21, 2024

(54) SEAT RAIL ASSEMBLY FOR FASTENING A SEAT ASSEMBLY IN A VEHICLE, USE OF A SEAT RAIL ASSEMBLY OF THIS TYPE IN AN AIRCRAFT, AND METHOD FOR PRODUCING A SEAT RAIL ASSEMBLY

(71) Applicant: Airbus Operations GmbH, Hamburg (DE)

(72) Inventors: Armin Fangmeier, Hamburg (DE); Sven Werner, Hamburg (DE); Bernd Schwing, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 40 days.

(21) Appl. No.: 17/613,435

(22) PCT Filed: Nov. 30, 2020

(86) PCT No.: PCT/EP2020/083992
§ 371 (c)(1),
(2) Date: Nov. 22, 2021

(87) PCT Pub. No.: WO2021/110611
PCT Pub. Date: Jun. 10, 2021

(65) Prior Publication Data
US 2022/0289390 A1  Sep. 15, 2022

(30) Foreign Application Priority Data
Dec. 6, 2019  (DE) ..................... 10 2019 133 362.8

(51) Int. Cl.
*B64D 11/06* (2006.01)
*B64C 1/18* (2006.01)
(52) U.S. Cl.
CPC ............ *B64D 11/0696* (2013.01); *B64C 1/18* (2013.01)

(58) Field of Classification Search
CPC ............................. B64D 11/0696; B64C 1/18
See application file for complete search history.

(56) References Cited

U.S. PATENT DOCUMENTS 5,556,565 A * 9/1996 Kirkwood ............... B64C 1/065
219/618
10,472,070 B2  11/2019 Born et al.
(Continued)

FOREIGN PATENT DOCUMENTS

DE 102007001806 A1  7/2008
DE 102009028533 A1 * 2/2011 ......... B60N 2/01575
(Continued)

OTHER PUBLICATIONS

International Search Report; priority document.
German Search Report; priority document.

*Primary Examiner* — Terrell L McKinnon
*Assistant Examiner* — Ding Y Tan
(74) *Attorney, Agent, or Firm* — Greer, Burns & Crain, Ltd.

(57) ABSTRACT

A seat rail assembly for fastening a seat assembly in a vehicle and a method for making such a seat rail assembly are described. The seat rail assembly includes a seat rail configured to fasten the seat assembly, the seat rail including a metal material. A fastening profile element of the seat rail assembly is configured to receive the seat rail, the fastening profile element being formed of a plastic material. The fastening profile element forms a receiving region, which is configured to receive the seat rail, and the seat rail includes a seat rail crown which is arranged in the receiving region of the fastening profile element such that a wall portion of the fastening profile element at least partly extends around the seat rail crown. The seat rail assembly may be used in an aircraft.

20 Claims, 3 Drawing Sheets

(56) References Cited

U.S. PATENT DOCUMENTS

| | | | |
|---|---|---|---|
| 11,104,441 B2 | 8/2021 | Gross | |
| 2005/0133666 A1* | 6/2005 | Zerner | B64D 11/0696 244/118.6 |
| 2006/0038071 A1* | 2/2006 | Schoene | B64D 11/0696 244/118.6 |
| 2010/0001126 A1 | 1/2010 | Supan et al. | |
| 2010/0067999 A1* | 3/2010 | Poupon | B60N 2/07 410/105 |
| 2010/0162567 A1 | 7/2010 | Kirkwood et al. | |
| 2014/0349042 A1* | 11/2014 | Schomacker | B64D 11/0696 428/34.1 |
| 2015/0225066 A1* | 8/2015 | Hanna | B64C 1/20 248/503.1 |
| 2016/0130004 A1 | 5/2016 | Vichniakov et al. | |
| 2019/0092478 A1 | 3/2019 | Gilbert | |
| 2020/0317321 A1* | 10/2020 | Tiryaki | B32B 3/04 |

FOREIGN PATENT DOCUMENTS

| | | | | |
|---|---|---|---|---|
| DE | 102015100189 A1 | * | 7/2016 | |
| DE | 102015100189 A1 | | 7/2016 | |
| DE | 102015120515 A1 | * | 6/2017 | ......... B64D 11/0693 |
| DE | 102015120515 A1 | | 6/2017 | |
| DE | 102016208650 A1 | | 11/2017 | |
| DE | 102016111994 A1 | | 1/2018 | |
| DE | 102016111999 A1 | | 1/2018 | |
| DE | 102018108190 A1 | | 10/2019 | |
| DE | 102018108296 A1 | * | 10/2019 | ........... B60N 2/0725 |
| EP | 1564141 A1 | * | 8/2005 | ............... B64C 1/18 |
| EP | 1600246 A1 | * | 11/2005 | ......... B23K 15/0006 |
| EP | 3020628 A1 | * | 5/2016 | ............... B64C 1/20 |
| EP | 3020628 B1 | | 1/2018 | |
| FR | 2864940 A1 | | 7/2005 | |
| FR | 2864940 A1 | * | 7/2005 | ............... B64C 1/20 |
| FR | 2864940 B1 | | 3/2007 | |
| FR | 2963262 A1 | * | 2/2012 | ........... B23K 26/242 |

\* cited by examiner

SEAT RAIL ASSEMBLY FOR FASTENING A SEAT ASSEMBLY IN A VEHICLE, USE OF A SEAT RAIL ASSEMBLY OF THIS TYPE IN AN AIRCRAFT, AND METHOD FOR PRODUCING A SEAT RAIL ASSEMBLY

CROSS-REFERENCES TO RELATED APPLICATIONS

This application claims the benefit of the International Application No. PCT/EP2020/083992, filed on Nov. 30, 2020, and of the German patent application No. 102019133362.8 filed on Dec. 6, 2019, the entire disclosures of which are incorporated herein by way of reference.

FIELD OF THE INVENTION

The present invention relates to seat rails for fastening seats in a vehicle. In particular, the invention relates to a seat rail assembly for fastening a seat assembly in a vehicle, to the configuration of a seat rail assembly of this type in an aircraft, and to a method for producing a seat rail assembly.

BACKGROUND OF THE INVENTION

Seat rails are used in vehicles for fastening seats, in particular passenger seats. In this case, the seat rails are generally embedded in a floor structure of the vehicle or are integrated therein. The seat rails are usually oriented in a longitudinal direction of the vehicle. In a seat rail, a plurality of seat assemblies arranged one behind the other can be fastened and, as required, can be moved in the longitudinal direction along the seat rail in order, in this way, for example, to set the seat spacing between seat assemblies arranged one behind the other. Seat rails are fastened in the floor structure of the vehicle in various ways, mechanical integrity being one of the significant factors. For example, corrosion properties, as well as the resistance of the mechanical fastening of the seat rail in the floor structure, particularly also in the case of crash loads, must meet certain requirements.

DE 10 2018 108 190 A1 describes, for example, a fastening system for passenger seats in a cabin of a vehicle, wherein the fastening system has two or more guide rails, which can be integrated in or on a floor of the cabin, and a plurality of slides, which can be brought into engagement with the guide rails and which comprise a flange for connection to a passenger seat in order to hold the relevant passenger seat on a guide rail.

DE 10 2007 001 806 A1 describes a mounting rail for mounting fittings in an aircraft with a coating of a coating material, wherein the coefficient of friction between the coating material and a material of an element to be mounted is lower than the coefficient of friction between a material of which the uncoated mounting rail consists and a material of an element to be mounted.

SUMMARY OF THE INVENTION

It is an object of the invention to improve the corrosion resistance of a seat rail assembly in a vehicle while simultaneously taking weight requirements into account.

According to one aspect of the invention, a seat rail assembly for fastening a seat assembly in a vehicle is specified. The seat rail assembly has a seat rail for fastening the seat assembly, wherein the seat rail comprises a metallic material. The seat rail assembly further has a fastening profile which is designed to receive the seat rail, wherein the fastening profile comprises a plastic. The fastening profile forms a receiving region, which is designed to receive the seat rail. The seat rail has a seat rail crown, which is arranged in the receiving region of the fastening profile in such a way that a wall section of the fastening profile at least partly surrounds the seat rail crown.

With such a seat rail assembly, it is possible to provide a seat rail fastening with sufficient strength with a comparatively small expenditure of material, it being possible to improve the corrosion resistance with respect to existing systems on the basis of the selection of a specific material combination for the seat rail and the fastening profile. Moreover, it is possible to provide comparatively simple production of the seat rail assembly, for example using a thermal forming method, wherein the production process is suitable for series production.

The seat rail assembly can be arranged in a floor structure of the vehicle, for example between two floor panels integrated in the vehicle. In this case, the fastening profile can establish a connection of the seat rail to structural elements, such as a floor grid, in order to fasten the seat rail assembly within a vehicle primary structure. Provision can be made here for the metallic seat rail not to come into direct contact with primary structural elements of the vehicle but to be shielded, as it were, from the primary structure of the vehicle by the fastening profile comprising the plastic. This is achieved by virtue of the fact that the wall section of the fastening profile at least partially surrounds the seat rail, in particular the seat rail crown. In this case, the expression "partially surround" can be understood to mean that at least three different outer surfaces of the seat rail, in particular three differently oriented outer surfaces of the seat rail, face the wall section of the fastening profile. For example, two opposite horizontal outer surfaces of the seat rail crown and an intermediate vertical outer surface of the seat rail crown each face one boundary wall of the wall section of the fastening profile. This interrelationship is explained in greater detail in the description of the figures.

The seat rail can have or consist of the seat rail crown. In one example, the seat rail crown thus forms the seat rail, which is thus arranged completely within the receiving region of the fastening profile. The receiving region can be formed by the wall section or the boundary walls of the fastening profile. In this case, the wall section or the fastening profile itself can be formed using two partial profiles, which thus together form the boundary walls for the receiving region.

The seat rail crown comprises a metallic material, e.g., a material which is based on titanium, aluminum or steel. In this case, a titanium material or a titanium-based material may be preferred on account of the corrosion resistance thereof. It is also possible to use a corrosion-resistant steel ("CRES").

The seat rail can consist of the metallic material, the seat rail thus being formed exclusively from this material. The seat rail crown can have a substantially rectangular shape in cross section, wherein a recess is provided in the seat rail crown, which recess is designed for receiving or fastening the seat assembly, for example by means of a connecting element (referred to as a stud).

The fastening profile comprises a plastic, e.g., a thermoplastic material or a thermosetting material. Provision can be made here for the plastic to be formed at elevated temperatures, that is to say, at a forming temperature, the fastening profile thus being brought by such a forming process into its final shape, in which the wall section of the fastening profile at least partially surrounds the seat rail crown.

Both the fastening profile and the seat rail can have a specific profile shape in a cross section. It should be noted that the geometrical descriptions of the seat rail assembly herein may relate to such a cross-sectional view.

According to one embodiment, the wall section at least partly surrounding the seat rail crown is produced by a forming process at a forming temperature.

As already indicated, the fastening profile and, in particular, the wall section comprises a plastic which can be formed at a forming temperature. In the present case, provision can be made for a part of the wall section, for example two upper boundary walls, to be shaped in such a way that an upper outer surface of the seat rail crown is covered by these two upper boundary walls, wherein the two upper boundary walls together form an upper, horizontal boundary wall after the forming process. The seat rail crown can thus be surrounded by the wall section of the fastening profile substantially on all outer surfaces, although an opening remains in the wall section, that is to say, the upper, horizontal boundary wall, in order thereby to allow the fastening of the seat assembly in the seat rail crown.

Forming can thus be accomplished by folding over the two upper boundary walls, for example in a separate production step provided for this purpose, which follows a step of inserting the seat rail into the receiving region of the fastening profile. The advantage of the resulting configuration is that the seat rail or the seat rail crown can be firmly integrated into the fastening profile and thus the required mechanical strength is provided with a comparatively low expenditure of material both for the seat rail itself and for the fastening profile.

According to one embodiment, the metallic material of the seat rail is a titanium material.

This provides high corrosion resistance. The higher material costs of titanium compared to aluminum or steel are compensated by the geometric configuration of the seat rail and the fastening profile which is described herein, in that, in particular, less material is used for the seat rail per se. In other words, the use of titanium material for the seat rail can be reduced by the seat rail assembly according to the invention, this being attributable, in particular, to the combination of plastic and titanium described herein and to the geometric configuration of the seat rail assembly. This in turn results in a cost advantage for the use of material in comparison with known seat rail systems. In particular, titanium also offers the required strength, which is of great importance for fastening the seat assembly on the seat rail assembly. Moreover, inspection intervals can be extended by using titanium.

According to one embodiment, the fastening profile comprises a fiber-reinforced plastic.

The fiber-reinforced plastic may be carbon fiber-reinforced plastic, glass fiber-reinforced plastic or aramid fiber-reinforced plastic, for example. In this context, it is preferably a carbon fiber-reinforced plastic. In this case, the respective fibers can be arranged in a plastic matrix of thermoplastic material or else of thermosetting material.

Pre-impregnated semi-finished products (prepregs) can also be used in the production of the fastening profile, these semi-finished products forming the wall section at least partially surrounding the seat rail crown, which wall section can then be cured. However, it is also possible to use one or more fiber-reinforced plastic blanks for the fastening profile, these being softened at the forming temperature in order then to give them their shape, in particular in order to, as it were, fold over the upper boundary walls of the wall section onto the upper outer surface of the seat rail crown.

According to one embodiment, the seat rail crown is enclosed by at least two horizontal boundary walls and a vertical boundary wall of the wall section.

In this case, the terms "horizontal" and "vertical" may refer to a cross section of the seat rail crown and of the fastening profile in their installed state in the vehicle. The same can apply to the terms "upper boundary wall" or "lower boundary wall". This is made clearer in the description of the figures.

The horizontal boundary walls also form an upper or lower end of the receiving region, in which the seat rail crown is partially enclosed. The horizontal boundary walls can thus face horizontal outer surfaces of the seat rail crown. The vertical boundary wall can be arranged between the two horizontal boundary walls and/or can be aligned perpendicularly with respect to the two horizontal boundary walls.

According to one embodiment, the receiving region is of substantially cuboidal design and the seat rail is arranged in such a way that it is arranged completely within the cuboidal receiving region.

It should be noted that the receiving region is cuboidal on account of its three-dimensional design and is therefore rectangular in its cross section. The boundary walls of the receiving region, which at the same time are also the boundary walls of the fastening profile, thus in each case face outer surfaces of the seat rail or seat rail crown. "Completely within the receiving region" can mean that the seat rail does not project beyond any of the boundary walls forming the wall section. Provision can be made for small projections to project only minimally beyond the upper boundary wall.

According to one embodiment, the receiving region is defined by two lateral boundary walls, a lower boundary wall and an upper boundary wall, wherein the upper boundary wall has an opening, with the result that the receiving region is open in a vertical direction.

The boundary walls can be parts of the wall section of the fastening profile, wherein the boundary walls are arranged in such a way that they at least partially surround or enclose the seat rail or the seat rail crown, but an access region in the upper boundary wall remains open in order to insert a connecting element for fastening the seat assembly on the seat rail assembly into the seat rail crown.

According to one embodiment, the seat rail crown has a recess, which is designed to receive a connecting element for fastening a seat assembly on the seat rail assembly.

The seat rail crown can be a "Douglas crown". When viewed in cross section, the width of the recess can vary in the vertical direction. In particular, the recess can have a smaller width at an upper outer surface of the seat rail crown than in a core region of the seat rail crown, similarly to an undercut. The width of the recess can likewise vary in a longitudinal direction of the seat rail, in particular in the region of the upper outer surface.

According to one embodiment, the recess of the seat rail crown is designed in the form of a depression in the vertical direction, with the result that the recess of the seat rail crown faces in the direction of the opening in the upper boundary wall of the receiving region when the seat rail is inserted into the receiving region.

This ensures that a connecting element which is intended to fasten the seat assembly on the seat rail assembly can engage in the recess through the opening of the upper boundary wall of the wall section. Provision can be made to prevent contact between the upper boundary wall of the wall section and the connecting element.

When the seat rail is inserted into the receiving region, all the boundary walls of the wall section can rest directly against the seat rail. In this case, the, for example, thermoplastic material of the boundary walls can be consolidated with the seat rail or seat rail crown, which means that the wall section of the fastening profile is mechanically connected to the seat rail or seat rail crown by the forming process at room temperature or at elevated temperature above room temperature. Furthermore, a positive connection can be provided between the seat rail or seat rail crown and the boundary walls, which brings about fixing of the seat rail or seat rail crown in the fastening profile. Such a positive connection can take place, for example, by lateral flanging of the seat rail crown onto the adjoining lateral boundary walls. However, provision can also be made for a bonding agent, for example an adhesive or some other material, to be arranged between the boundary walls and the seat rail in order to ensure secure retention of the seat rail within the receiving region defined by the boundary walls.

According to one embodiment, the seat rail crown has projections in the region of the recess, which extend in the vertical direction, wherein the projections end at an edge of the opening in the upper boundary wall of the receiving region when the seat rail is inserted into the receiving region.

This prevents contact between the connecting element which fastens the seat assembly in the seat rail assembly and the upper boundary wall of the wall section. Since the fastening profile and thus the wall section and also the upper boundary wall comprise a plastic material, in particular a fiber-reinforced plastic, contact of the connecting element with the boundary wall could cause wear of the possibly softer plastic material, but this can be avoided by the arrangement of the projections on the seat rail. The projections can thus be arranged between the connecting element to be accommodated in the seat rail crown and the upper boundary wall. The projections thus project slightly beyond the upper outer surface of the seat rail crown and can comprise the same metallic material as the seat rail crown.

According to a further aspect of the invention, use of a seat rail assembly of the kind described above and below in an aircraft is specified.

The aircraft is, for example, a passenger or transport aircraft, wherein the seat rail assembly can form part of a floor structure of the passenger or transport aircraft. It is also possible to use the seat rail assembly according to the invention in shipbuilding or in transport generally, for example in buses or automobiles.

According to a further aspect of the invention, a method for producing a seat rail assembly is specified. In one step of the method, a seat rail having a seat rail crown is supplied, wherein the seat rail comprises a metallic material. In a further step, a fastening profile having a receiving region and a wall section is supplied, wherein the fastening profile comprises a plastic. In a further step, the seat rail is inserted into the receiving region of the fastening profile. In a further step, the fastening profile is heated to a forming temperature which is suitable, in particular, for softening a fiber-reinforced plastic. The forming temperature can be a room temperature of about 20° C. However, the forming temperature can also be above this, for example above 50° C., above 100° C. or above 200° C. In a further step, the fastening profile is formed, with the result that the wall section of the fastening profile at least partially surrounds the seat rail crown of the seat rail.

These steps of the method can be carried out in the sequence indicated or in any desired sequence.

DETAILED DESCRIPTION OF THE PREFERRED EMBODIMENTS

The illustrations in the figures are schematic and not to scale.

If the same reference signs are used in various figures in the following description of the figures, they designate identical or similar elements. However, identical or similar elements can also be designated by different reference signs.

Figure 1:
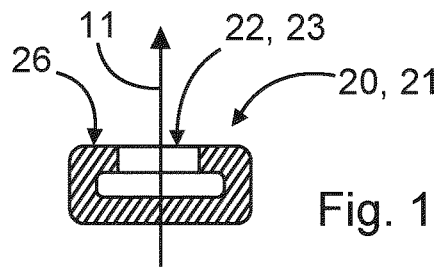
FIG. 1 shows a seat rail according to one exemplary embodiment of the invention.

FIG. 1 shows a metallic seat rail 20, in particular a seat rail crown 21, which is also referred to as a "Douglas crown". The seat rail crown 21 has a recess 22 in the form of a depression 23 which, starting from an upper outer surface 26 of the seat rail crown 21, extends along a vertical direction 11 into the seat rail crown 21. FIG. 1 shows a cross-sectional view of the seat rail 20 or seat rail crown 21, which has a substantially rectangular cross-sectional profile. The seat rail 20 or seat rail crown 21 can be an elongated component made of a titanium material, which extends into the plane of the drawing of FIG. 1.

Figure 2:
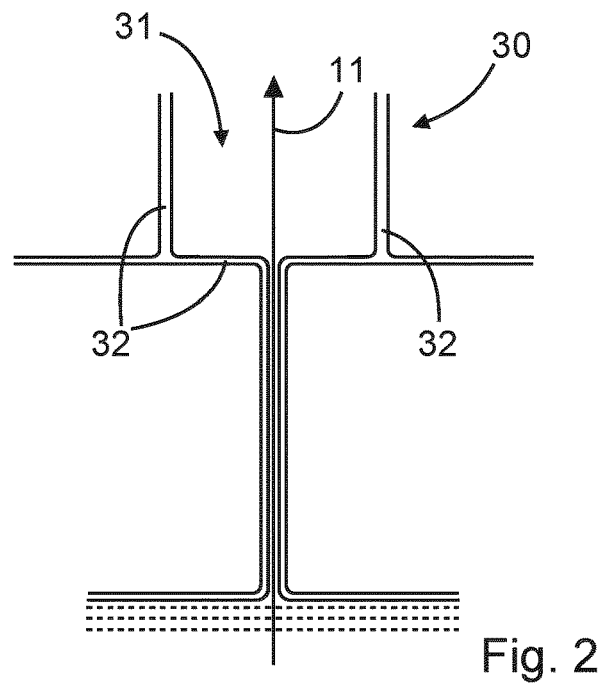
FIG. 2 shows a fastening profile according to one exemplary embodiment of the invention.

FIG. 2 shows a fastening profile 30 made of a fiber-reinforced plastic material, this too being concerned with a cross section of the profile. As can be seen in FIG. 2, in order to form the profile, two substantially U-shaped profile cross sections can be arranged next to one another, which together form the fastening profile 30. The U-shaped profile cross sections each have a laterally projecting flange in the form of boundary walls, which project laterally from the U-shaped profile cross sections (the upwardly projecting walls in FIG. 2). These boundary walls form part of a wall section 32 of the fastening profile 30, wherein the wall section 32, including lateral, vertical boundary walls and a lower, horizontal boundary wall, forms a receiving region 31. Here, the wall section 32 has a fork shape.

Figure 3:
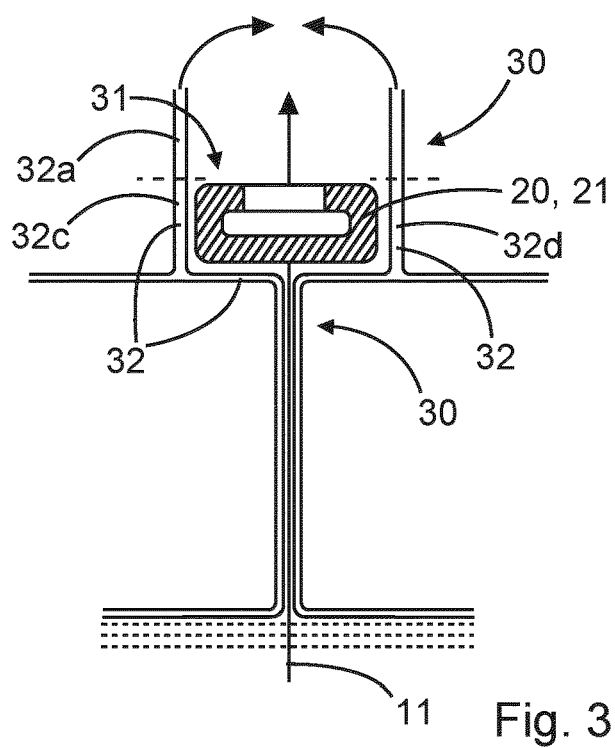
FIG. 3 shows the seat rail of FIG. 1, inserted into the fastening profile of FIG. 2, according to one exemplary embodiment of the invention.

As can be seen in the cross-sectional view of FIG. 3, the seat rail 20, which in the present case is formed completely by the seat rail crown 21, is inserted into the receiving region 31 of the fastening profile 30 of FIG. 2. Furthermore, the two lateral, vertical boundary walls 32c and 32d can be seen here. These lateral, vertical boundary walls 32c and 32d have extended regions of the boundary walls 32a which are formed in a forming process, in particular are bent over or folded over in the direction of the arrows illustrated, with the result that these extended regions of the boundary walls 32a together form an upper, horizontal boundary wall 32a of the wall section 32 and thus of the receiving region 31, as illustrated in FIGS. 4 and 5.

Figure 4:
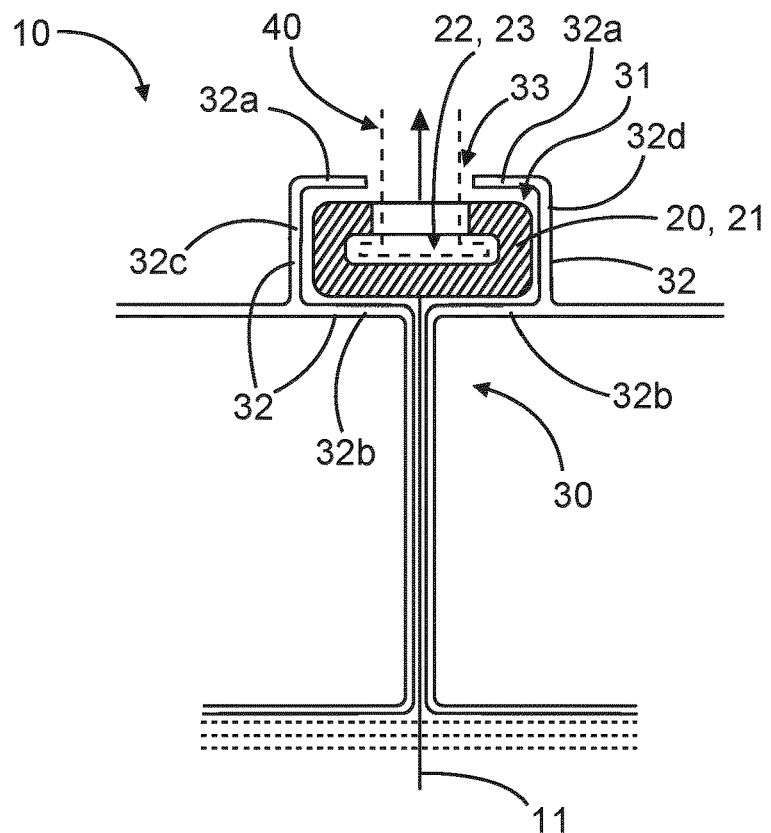
FIG. 4 shows a seat rail assembly according to one exemplary embodiment of the invention.
Figure 5:
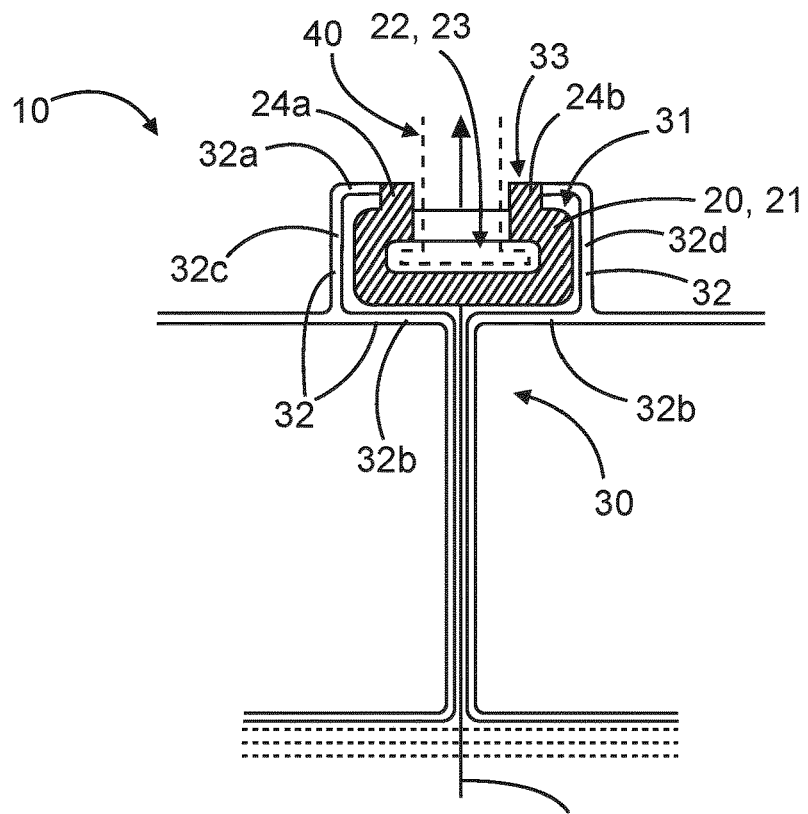
FIG. 5 shows a seat rail assembly according to another exemplary embodiment of the invention.

FIGS. 4 and 5 show cross sections of two alternative examples of a seat rail assembly 10, wherein the seat rail assembly 10 in each case comprises the seat rail 20 and the fastening profile 30. The seat rail assembly 10 is embodied for fastening a seat assembly, not illustrated in FIGS. 4 and 5, in a vehicle 100 (FIG. 6), it being possible for fastening to be accomplished by means of a connecting element 40, illustrated by dashed lines. The connecting element can be part of the seat rail assembly 10 or part of the seat assembly, wherein the seat assembly and the seat rail assembly 10 can together form a seat system.

In any case, the seat rail assembly 10 has a seat rail 20 for fastening the seat assembly, wherein the fastening profile 30 is again designed to receive the seat rail 20 in the receiving region 31. The seat rail 20 has or is formed by the seat rail crown 21. The seat rail crown 21, that is to say, the region of the seat rail 20 which has the fastening recess 22, is arranged in the receiving region 31 of the fastening profile 30 in such a way that the wall section 32 of the fastening profile 30 at least partially surrounds the seat rail crown 21 and thus the fastening recess 22. The wall section 32 at least partly surrounding the seat rail crown 21 can be produced by a forming process at a forming temperature, wherein the upper boundary wall 32a is produced by folding over the extended walls 32a illustrated in FIG. 3 with respect to the lateral, vertical boundary walls 32c, 32d in the direction (arrow direction) of the receiving region 31, with the result that edges are produced in the wall section 32 at the dashed lines illustrated in FIG. 3 (cf. FIGS. 4 and 5). This can take place at elevated temperatures at which the plastic material of the fastening profile 30 or of the wall section 32 is softened. This can also be achieved by the wall section 32 being in the form of a pre-impregnated semi-finished product and then being shaped into the arrangement illustrated in FIGS. 4 and 5 and subsequently cured.

The seat rail crown 21 is enclosed by the two horizontal boundary walls 32a, 32b and a vertical boundary wall 32c as well as a further vertical boundary wall 32d of the wall section 32. In particular, a respective outer surface of the seat rail crown 21 faces each of the boundary walls 32a, 32b, 32c and 32d, or the outer surfaces in each case rest against the boundary walls 32a, 32b, 32c and 32d. The receiving region 31 is of substantially rectangular design in cross section in order to receive the seat rail 20 in such a way that it is arranged completely within the rectangular receiving region 31. Here, the receiving region 31 is defined by the two lateral boundary walls 32c, 32d, the lower boundary wall 32b and the upper boundary wall 32a.

However, the upper boundary wall 32a has an opening 33, with the result that the receiving region 31 is open in a vertical direction 11. The fastening profile 30 and also the seat rail 20 are each an elongate profile which extends into the plane of the drawing in FIGS. 4 and 5. Thus, in a three-dimensional representation, the opening 33 is an elongate opening 33.

The seat rail crown 21 has a recess 22, which is designed to receive the connecting element 40 (illustrated by dashed lines in FIGS. 4 and 5) for fastening the seat assembly (not illustrated) on the seat rail assembly 10. In this case, the recess 22 of the seat rail crown 21 is designed in the form of a depression 23 in the vertical direction 11 (see FIGS. 4 and 5), with the result that the recess 22 of the seat rail crown 21 faces in the direction of the opening 33 in the upper boundary wall 32a of the receiving region 31 when the seat rail 20 is inserted into the receiving region 31.

FIGS. 4 and 5 each show examples in which the seat rail 20 has been inserted into the receiving region 31. The connecting element 40 thus extends through the opening 33 in the upper, horizontal boundary wall 32a into the recess 22 or depression 23.

FIGS. 4 and 5 illustrate alternative embodiments, the above description applying mutatis mutandis to both alternatives. However, the example in FIG. 5 differs from the example in FIG. 4 in that the seat rail crown 21 has projections 24a, 24b in the region of the recess 22, which extend in the vertical direction 11 out of the upper outer surface of the seat rail crown 21. The projections 24a, 24b end at an edge of the opening 33 in the upper boundary wall 32a of the receiving region 31 when, as illustrated in FIG. 5, the seat rail crown 21 has been inserted into the receiving region 31. In this context, "end" can mean that contact between the connecting element 40 and the fiber-reinforced plastic of the fastening profile 30, in particular with the upper boundary wall 32a of the fastening profile 30, is prevented. This means, in other words, that undesirable impacts between the upper boundary wall 32a and the connecting element 40 can be avoided. Likewise, contact corrosion between the materials can thereby be avoided. Thus, the projections 24a, 24b serve primarily to protect the wall section 32 of the fastening profile 30, but can also bring about even better fastening of the seat rail 20 in the fastening profile 30.

The seat rail assembly 10 illustrated in FIGS. 4 and 5 can be arranged in the region of floor panels of a vehicle floor structure. Although these floor panels are not illustrated in the figures, a floor panel can, however, be arranged in such a way with reference to FIGS. 4 and 5 that the lateral boundary wall 32c is located between the seat rail 20 and the floor panel. Likewise, a further floor panel can be arranged in such a way that the lateral boundary wall 32d is located between the seat rail 20 and the floor panel, resulting in a mirror symmetrical arrangement with respect to the vertical direction 11.

Figure 6:
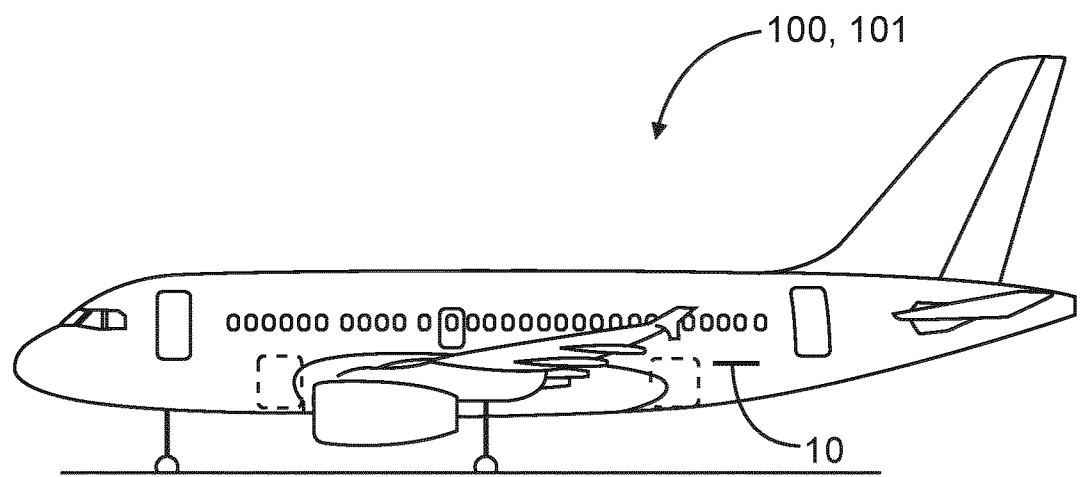
FIG. 6 shows an aircraft with a seat rail assembly according to one exemplary embodiment of the invention.

FIG. 6 shows a vehicle 100, in particular an aircraft 101 with a seat rail assembly 10, which can be integrated into a floor structure or a floor grid structure of the aircraft fuselage. In this case, the seat rail assembly 10 can be arranged in the region of floor panels or between floor panels of the floor structure. The seat rail assembly 10 can thus be used for the detachable or slidable fastening of passenger seats in the aircraft 101.

Figure 7:
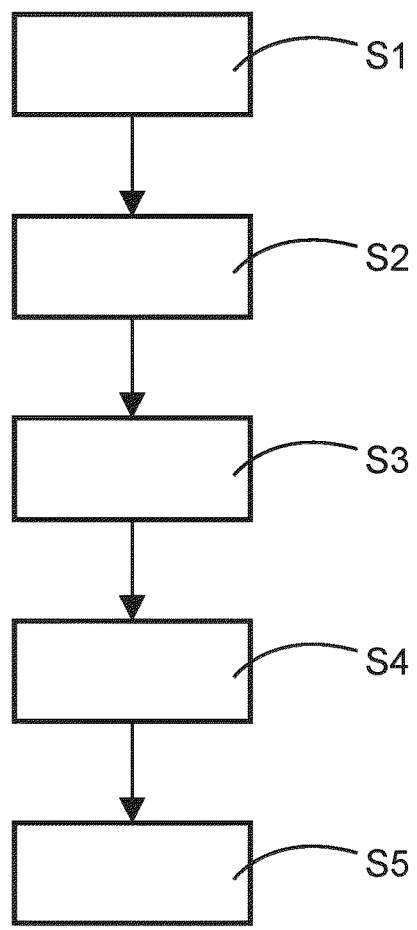
FIG. 7 shows a flow chart for a method for producing a seat rail assembly according to one exemplary embodiment of the invention.

FIG. 7 shows a method for producing a seat rail assembly 10. In a step S1 of the method, a seat rail 20 having a seat rail crown 21 is supplied, wherein the seat rail 20 comprises a metallic material. In a further step S2, a fastening profile 30 having a receiving region 31 and a wall section 32 is supplied, wherein the fastening profile 30 comprises a plastic. In a further step S3, the seat rail 20 is inserted into the receiving region 31 of the fastening profile 30. In a further step S4, the fastening profile 30 is heated at least partially to a forming temperature S4. In a further step S5, the fastening profile 30 is deformed, with the result that the wall section 32 of the fastening profile 30 at least partially surrounds the seat rail crown 21 of the seat rail 20 S5.

In addition, it should be noted that "comprising" does not exclude other elements or steps and "a" or "an" does not exclude a multiplicity. Furthermore, it should be noted that features or steps which have been described with reference to one of the above exemplary embodiments can also be used in combination with other features or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure the term "or" means either or both This disclosure hereby incorporates by reference the complete disclosure of any patent or application from which it claims benefit or priority.

The invention claimed is:

1. A seat rail assembly configured to fasten a seat assembly in a vehicle, comprising:
a seat rail configured to fasten the seat assembly, wherein the seat rail comprises a metallic material;
a fastening profile configured to receive the seat rail, wherein the fastening profile comprises a plastic material;
wherein the fastening profile forms a receiving region, which is configured to receive the seat rail;
wherein the seat rail has a seat rail crown, which is arranged in the receiving region of the fastening profile such that a wall section of the fastening profile at least partly surrounds the seat rail crown; and
wherein the receiving region is defined by two vertical boundary walls, a lower boundary wall, and two upper horizontal boundary walls, the upper horizontal boundary walls being aligned perpendicularly with respect to the two vertical boundary walls.

2. The seat rail assembly as claimed in claim 1, wherein the wall section at least partly surrounding the seat rail crown is produced by a forming process at a forming temperature.

3. The seat rail assembly as claimed in claim 1, wherein the metallic material of the seat rail is a titanium material.

4. The seat rail assembly as claimed in claim 1, wherein the fastening profile comprises a fiber-reinforced plastic material.

5. The seat rail assembly as claimed in claim 1, wherein the seat rail crown is enclosed by the two vertical boundary walls, the lower boundary wall and the two upper horizontal boundary walls.

6. The seat rail assembly as claimed in claim 1, wherein the receiving region is of substantially cuboidal design and the seat rail is arranged such that the seat rail is arranged completely within the cuboidal receiving region.

7. The seat rail assembly as claimed in claim 1,
wherein the two upper horizontal boundary walls form an opening, such that the receiving region is open in a vertical direction.

8. The seat rail assembly as claimed in claim 7, wherein the seat rail crown has a recess, which is configured to receive a connecting element for fastening a seat assembly on the seat rail assembly.

9. The seat rail assembly as claimed in claim 8, wherein the recess of the seat rail crown is configured as a depression in the vertical direction, such that the recess of the seat rail crown faces in a direction of the opening formed by the two upper horizontal boundary walls of the receiving region when the seat rail is inserted into the receiving region.

10. The seat rail assembly as claimed in claim 7,
wherein the seat rail crown has projections in a region of the recess, which extend in the vertical direction, and
wherein the projections end at an edge of the opening formed by the two upper horizontal boundary walls of the receiving region when the seat rail is inserted into the receiving region.

11. The seat rail assembly as claimed claim 1, wherein the seat rail assembly is incorporated in an aircraft.

12. A method for producing a seat rail assembly comprising the following steps:
supplying a seat rail having a seat rail crown, wherein the seat rail comprises a metallic material;
supplying a fastening profile having a receiving region and a wall section comprising two vertically extending walls, wherein the fastening profile comprises a plastic material;
inserting the seat rail into the receiving region of the fastening profile;
heating the fastening profile to a forming temperature;
forming the fastening profile, while the fastening profile is at the forming temperature, by bending a portion of each of the two vertically extending walls inwardly to form two upper horizontal boundary walls, such that the wall section of the fastening profile at least partially surrounds the seat rail crown of the seat rail.

13. The method for producing a seat rail assembly as claimed claim 12, wherein the two upper horizontal boundary walls are aligned perpendicularly with respect to the vertically extending walls.

14. The method for producing a seat rail assembly as claimed claim 12, wherein the two upper horizontal boundary walls have a uniform thickness.

15. The method for producing a seat rail assembly as claimed claim 12, wherein the receiving region is of substantially cuboidal design and the seat rail is arranged such that the seat rail is arranged completely within the cuboidal receiving region.

16. The method for producing a seat rail assembly as claimed claim 12, wherein the two upper horizontal boundary walls form an opening, such that the receiving region is open in a vertical direction.

17. The method for producing a seat rail assembly as claimed claim 16, wherein the seat rail crown has a recess which is configured to receive a connecting element for fastening a seat assembly on the seat rail assembly.

18. The method for producing a seat rail assembly as claimed claim 17, wherein the recess of the seat rail crown is configured as a depression in the vertical direction, such that the recess of the seat rail crown faces in a direction of the opening formed by the two upper horizontal boundary walls of the receiving region when the seat rail is inserted into the receiving region.

19. The method for producing a seat rail assembly as claimed claim 16, wherein the seat rail crown has projections in a region of the recess, which extend in the vertical direction, and
wherein the projections end at an edge of the opening formed by the two upper horizontal boundary walls of the receiving region when the seat rail is inserted into the receiving region.

20. The seat rail assembly as claimed claim 1, wherein the two upper horizontal boundary walls have a uniform thickness.

* * * * *